Aug. 1, 1967  R. H. VAN NOTE  3,333,695
LIQUID CLARIFICATION METHOD AND APPARATUS FOR
PRODUCING HIGH DENSITY SLUDGE
Filed Aug. 19, 1964  5 Sheets-Sheet 1

*INVENTOR.*
ROBERT H. VAN NOTE
BY Robert W. Habel
ATTORNEY

INVENTOR.
ROBERT H. VAN NOTE
BY Robert W. Habel
ATTORNEY

INVENTOR.
ROBERT H. VAN NOTE
BY Robert W. Habel
ATTORNEY

INVENTOR.
ROBERT H. VAN NOTE

United States Patent Office 3,333,695
Patented Aug. 1, 1967

3,333,695
LIQUID CLARIFICATION METHOD AND APPARATUS FOR PRODUCING HIGH DENSITY SLUDGE
Robert H. Van Note, Monroe, Conn., assignor to The Eimco Corporation, Salt Lake City, Utah, a corporation of Delaware
Filed Aug. 19, 1964, Ser. No. 390,632
10 Claims. (Cl. 210—83)

This invention relates to the clarification of liquids containing settleable solids and particularly to sedimentation or clarification apparatus for obtaining a more dense or thicker sludge underflow.

Clarification apparatus of the type comprising a sedimentation tank for holding a continuous flow of liquid containing suspended solids, and rotating rake means for moving settled solids along the bottom of the tank to either a central or peripheral discharge area have been used for many years. However, it has been found that in the clarification of many industrial liquors the sludge produced from such apparatus is not as dense as desired. This is particularly true in the clarification of any liquors containing soluble values where it is desirable to maintain as little loss of liquid with the sludge underflow as possible, such as white liquor from paper pulp production or juices and liquids incident to the manufacture of sugar wherein high solids content in the sludge by-product not only reduces loss of liquid containing valuable solids but also greatly facilitates sludge disposal or re-use in the process.

Accordingly, it is a primary object of this invention to provide improved ways and means for obtaining a more dense sludge during the clarification of liquids containing suspended solids.

An important object of the invention is to provide a clarifier control and valve system for selectively removing the highest density sludge from the clarifier and which is capable of accommodating a wide range of sludge production.

Another object of the invention is to provide a light weight clarifier construction for obtaining high density underflow that is inexpensive and requires minimum operator attention.

The invention is based upon the discovery that in clarification apparatus of the type described there exists a sludge zone of much higher density immediately in front of the rake means than that normally held in the compression or final sedimentation zone across the bottom of the tank. The quantity of high density sludge extending in front of the rake depends upon the amount of sludge held in inventory in the clarifier while the density remains substantially the same immediately in front of the rake means no matter what the quantity.

In its broadest aspect the invention comprises a method and apparatus for the clarification of liquids containing settleable solids in which only the thick sludge extending in front of the rake means is periodically withdrawn from the tank. In other words, sludge discharge is intermittent based on the position of the rake means in relation to the sludge outlet such that only high density sludge is withdrawn.

Briefly, the apparatus of the invention comprises a settling tank provided with influent feed means, effluent withdrawal means, rotatable rake means centrally mounted in the tank for outwardly raking settled sludge on the bottom of the tank to one or more peripheral sludge discharge outlets, valve means in said outlets, means for periodically opening said valve means in relation to the position of said rake means and means responsive to the quantity of high density sludge extending in front of the rake means for varying the amount of sludge withdrawn during each discharge period.

The quantity of high density sludge in front of the rake means is a function of the total sludge inventory in the tank which as used herein means the total weight of solids in suspension in said tank. High density sludge quantity may also be determined by measuring the density of sludge withdrawn at discharge or as a function of the torque on the rake.

In order that the invention may be more readily understood and carried into effect, reference is made to the accompanying drawings and the description thereof which are offered by way of illustration only and not in limitation of the invention, the scope of which is defined by the appended claims rather than any description preceding them.

Figure 1:
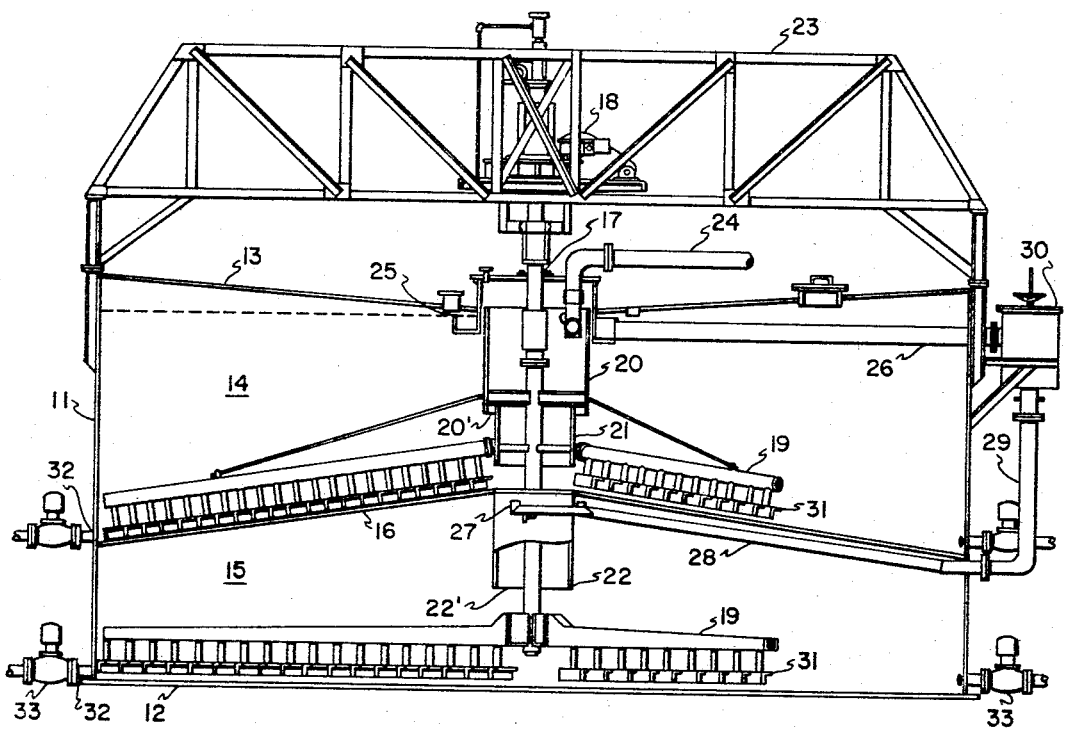
FIG. 1 is a vertical section through the clarifying apparatus of the invention, certain elements shrown in elevation for purposes of clarity.
Figure 2:
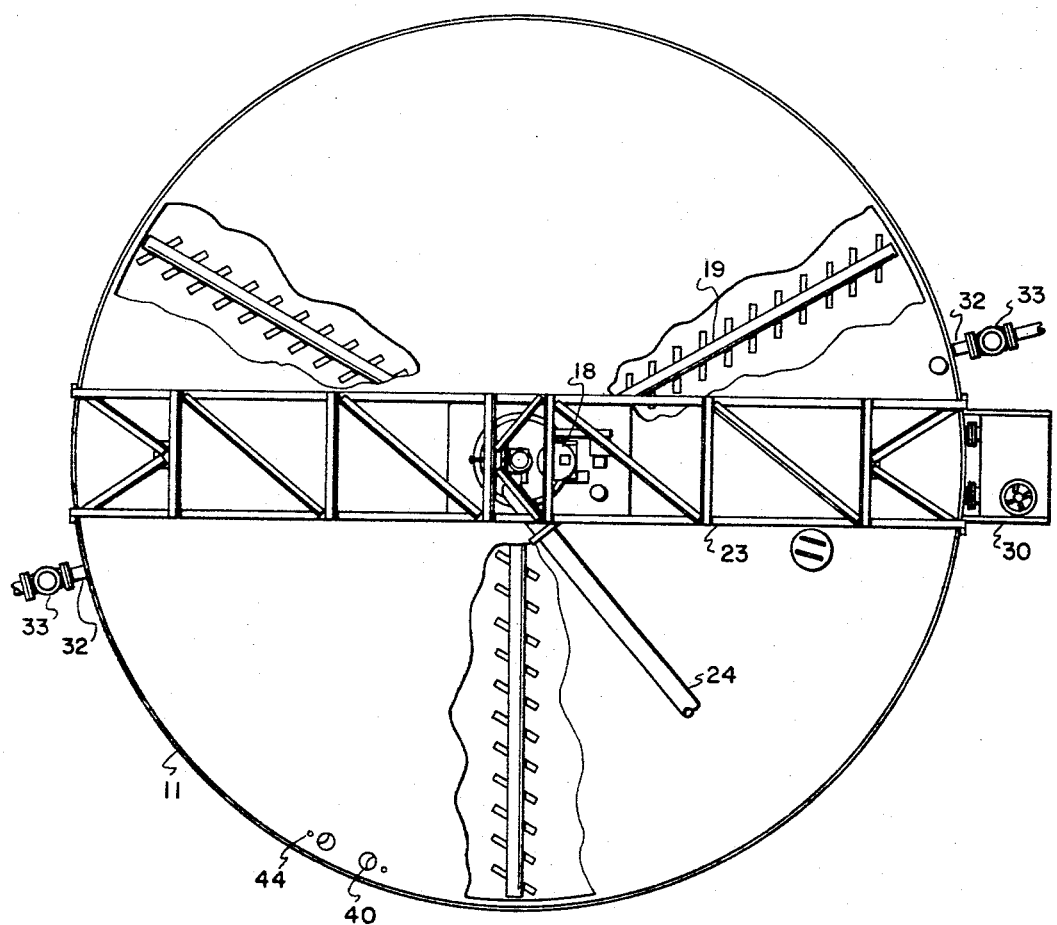
FIG. 2 is a top view of the apparatus of FIG. 1, portions of the tank cover cut away to illustrate the location of the rake means.

Referring to FIGS. 1 and 2, there is shown an upright cylindrical settling tank having an outside wall 11, bottom 12 and cover 13 divided into an upper compartment 14 and lower compartment 15 by outwardly sloping partition or tray 16. A shaft 17 driven by conventional drive means 18 is centrally mounted within the tank providing rotary movement to upper and lower rake arms 19 mounted thereon and for supporting rotating feedwell 20 and boot 21. A stationary boot 22 is mounted on partition 16. The shaft and drive means are supported by conventional superstructure 23 which spans the tank and is mounted on the tank wall.

Liquid influent is fed through conduit 24 to feedwell 20 entering upper compartment 14 through the annular opening 20' between feedwell 20 and boot 21, and lower compartment 15 through the bottom opening 22' of boot 22. Openings 20' and 22' are substantially equal in area thus assuring an equal distribution of flow to both compartments. The liquid level in the tank is indicated by the dotted line. Clarified effluent is withdrawn from the upper compartment via central overflow launder 25 and connecting pipe 26 and from the lower compartment via a plurality of outlet ports 27 in the yoke portion of pipe 28 located adjacent the roof of the compartment. Pipe 28 is connected to a standpipe 29 which together with pipe 26 discharge into outside overflow box 30 from which the clarified effluent is withdrawn.

The rake arms 19 are provided with depending rake blades 31 positioned such that upon rotation of the arms an outward raking action is imparted to the sludge settling on the bottom of both compartments. Thickened sludge reaching the periphery of each compartment is withdrawn through sludge discharge outlets 32, two of which are shown placed on opposite sides of the tank in the bottom of each compartment.

As noted, the invention comprises intermittently discharging the high density sludge in each compartment from immediately in front of the rake arms. To this end there is provided in each sludge discharge outlet a pinch valve 33 of the normally closed type. While this is the preferred type valve it is to be understood that other type valves, pumps or other type controlled discharge means may be used. The periods in which the valves are open and closed can best be seen by reference to FIG. 3 which schematically illustrates the position of the rake arms in relation to the underflow outlets in one tank compartment. In the illustrated embodiment three centrally mounted rake arms 19, 19' and 19" are provided spaced 120° apart in combination with two outlets 32 and 32' spaced 180° apart. However, any combination of rake arms to outlets may be employed. The segments marked A and A' represent the location of the arms in relation to the outlets during the intervals of sludge discharge. Conversely the segments marked B and B' indicate the position of the arms during rotation when the valves are closed and no discharge occurs. A preset timing means, to be explained more fully hereinafter, controls the periods during which the valves are open and closed. Thus, when rake 19 reaches position C the timing means opens valve 33 allowing the high density sludge in front of the rake to be withdrawn through outlet 32 until rake 19 reaches position D whereupon valve 32 is closed until the next following arm reaches position C.

As is evident, during the interval in which arm 19 is in the discharge zone A arm 19' is simultaneously approaching zone A'. About the time sludge discharge from outlet 32 ceases, arm 19' enters zone A' whereupon sludge is withdrawn through outlet port 32' until arm 19' is in line with port 32' at which time the valve is automatically closed and sludge discharge ends. The cycle is similarly repeated when arm 19" reaches zone A and so on as the arms rotate around the compartment.

The angular segment between rake arm and sludge outlet during the period in which sludge is withdrawn should be kept to a minimum to insure that only the thickest sludge immediately in front of the arm is discharged. This angle may vary depending upon the number of rake arms and discharge conduits employed and solids loading to the clarifier. Ideally, the angular segment should be large enough to encompass all of the high density sludge in front of the arm and small enough so that thinner sludge in the bottom compression zone is not included. In any case it is essential that the angle be small enough to insure that sludge is withdrawn intermittently from each sludge outlet.

In addition to the timed withdrawal of sludge from the clarifier, means may be provided for regulating the degree each valve is opened during each discharge period based upon the quantity of thickened sludge in front of the rake arms. This quantity, as previously noted, may be determined from the weight of solids held in inventory.

Figure 4:
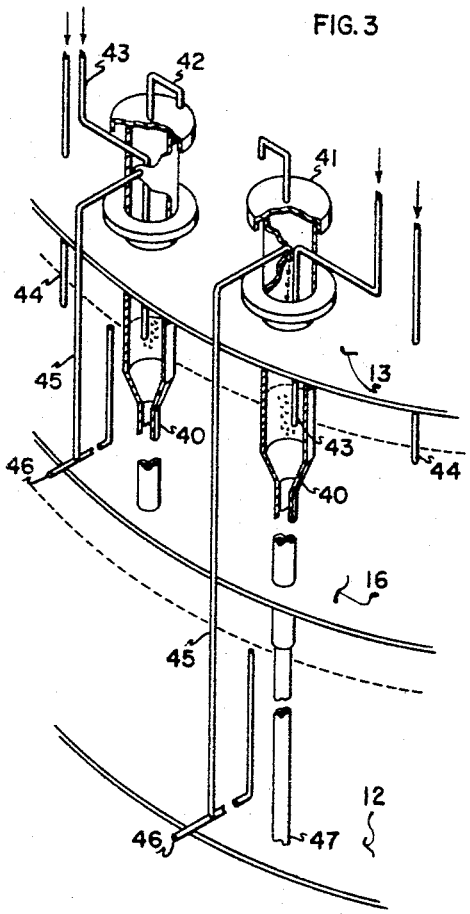
FIG. 4 is a perspective view partly in section of out type of sludge quantity sensing device that may be used in the apparatus of FIG. 1, a section of the tank shown to illustrate its relative position therein.

In the embodiment illustrated in FIG. 4 sensing means are shown for determining the weight of solids at any one time held in each clarifier compartment such determination being a function of the quantity of sludge in front of the rake arms. In each compartment such means comprises a downwardly extending flow tube 40 mounted on the tank cover having an enlarged upper portion and narrow lower probe portion terminating a short distance above the floor of the compartment. A cap 41 rests on top of the tube and the tube is vented as at 42. An inside air bubbler tube 43 and an outside air bubbler tube 44 extend a set distance beneath the normal liquid level (indicated by the dotted lines) in the compartment and are connected to a constant pressure air supply source. Bubbler tube 44 records a back pressure commensurate with the depth it is placed under the liquid level in the compartment, such level remaining fairly constant and therefore the back pressure induced being substantially constant. If the liquid level changes, the relationship between tubes 43 and 44 still remains the same. A pipe 45 extending downward from inside the compartment through the outside wall thereof and upward into the flow tube transfers liquid from the compartment to the flow tube by air pressure introduced through inlet 46. The weight of thickened sludge in the compartment above outlet 47 at the bottom of the flow tube creates a superelevation in the liquid flowing therethrough. The higher head in the flow tube induces increased back pressure in bubbler tube 43 and the difference in pressure between tubes 43 and 44 indicates the weight of solids held in the compartment. Means are provided for recording and transmitting this determination to the valves for controlling the degree they are opened during each discharge cycle.

With such an arrangement it can be seen that in operations where large variations in solids loadings to the clarifier are present the amount of sludge withdrawn during each discharge period can be varied without changing the timing cycle. In other words, with say a lower than normal solids loading to each clarified compartment the weight of solids held in inventory will be less and consequently the quantity of high density sludge in front of each rake arm will be less. Since the timed period of sludge withdrawal will remain constant a lesser amount of sludge can be discharged by reducing the opening in the valves thereby assuring that only the thickest sludge in front of the rake arms is removed.

Figure 5:
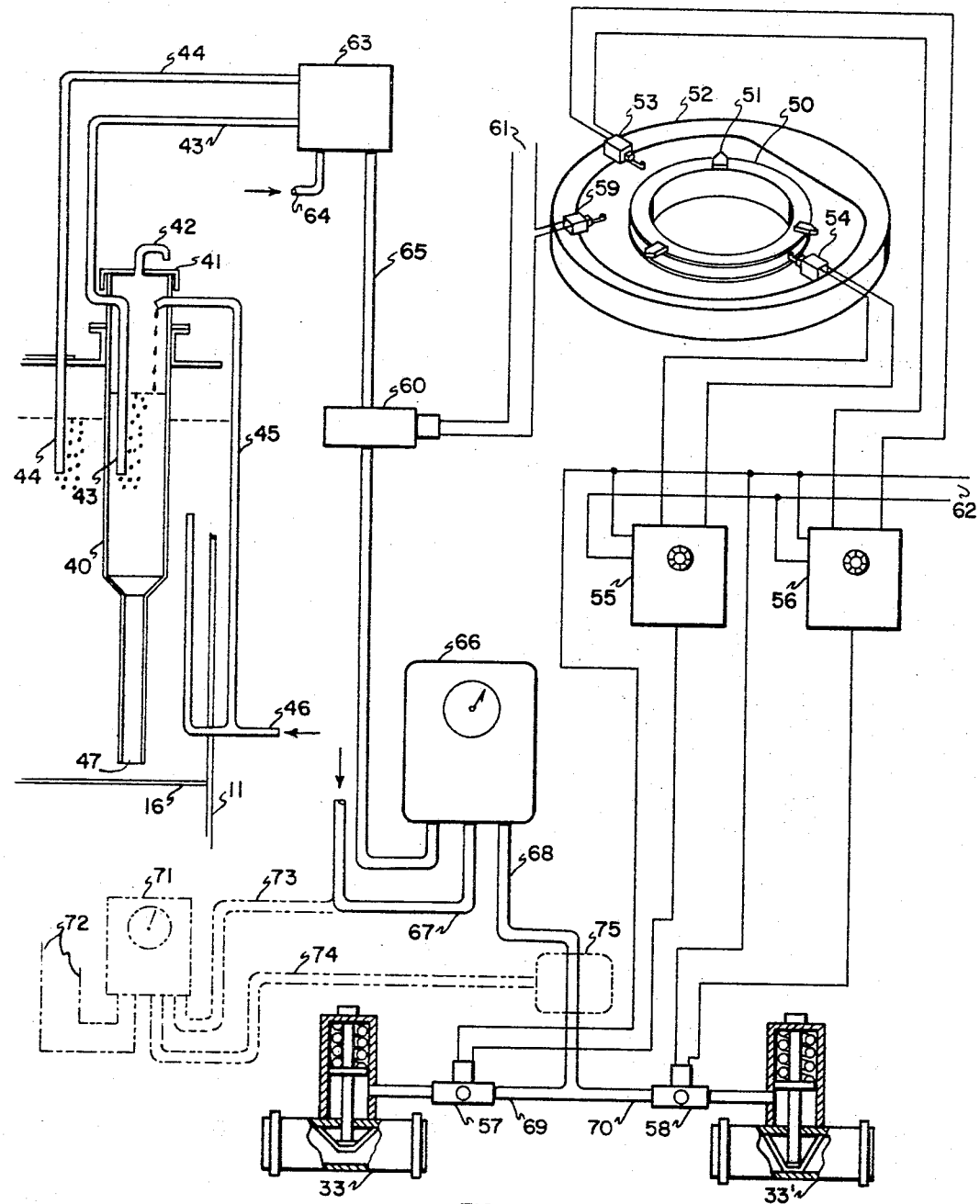
FIG. 5 is a schematic diagram of the sensing device in combination with the pneumatic and electrical control circuits for operating the sludge outlet valves of the apparatus of FIG. 1.

In FIG. 5 there is schematically illustrated the electrical timing circuit and pneumatic control circuit for operating the underflow valves of one compartment using the sludge inventory sensing device of FIG. 4. On the centrally mounted drive shaft there is fixedly mounted rotating ring 50 carrying actuator cams 51 positioned such that they are in radial alignment with the rake arms in the compartment as can be more clearly seen from FIG. 3. While this is the preferred relationship between arms and cams it will be understood that they may be positioned in any fashion so long as they are spaced the same on the shaft, in other words, the same angular distance between arms as between cams. A stationary outer ring 52, mounted co-axially with ring 50 has fixed thereon switches 53 and 54 in radial alignment with underflow discharge outlets 32 and 32'. Connected to each switch are timers 55 and 56 controlling the circuit to normally closed three-way solenoid valves 57 and 58 in the pneumatic line operating discharge valves 33 and 33'. A third switch 59 is mounted on ring 52 in radial alignment with a point just preceding the position of flow tube sludge measuring means 40 (see FIG. 3), for actuating the circuit to normally closed two-way solenoid air valve 60. Switch 59 and solenoid valve 60 are connected to a standard 110 volt power source as at 61 and timers 55 and 56 are connected to a similar power source at 62.

As previously explained, increased back pressure is induced in bubbler tube 43 by the higher liquid level in flow tube 40 caused by the solids loading in the compartment. Tube 43 together with bubbler tube 44 are connected to differential pressure transmitter unit 63 to which is connected a constant air supply source through line 64. Unit 63 determines the difference in back pressure between tubes 43 and 44 and this pressure differential is then transmitted via pneumatic line 65 to a conventional recorder controller 66, connected to a constant air supply line 67. From recorder controller 66 an amplified pneumatic signal is sent via line 68 and branch lines 69 and 70 to spring closed pinch valves 33 and 33' thereby controlling the degree they are opened during each timing period by the weight of solids held in inventory in the compartment which is a function of quantity of high density sludge in front of the rake arm.

Operation of one compartment of the clarifier in accordance with the aforedescribed control circuit is as follows, it being understood that the other compartment may operate simultaneously therewith using the same actuator cams and switches with duplicate controls or on a different cycle as desired. As actuator cams 51 rotate with drive shaft 17 they periodically depress switches 53 and 54. Each closing of a switch periodically energizes one of the timers initiating a pre-set timing period, during which the circuit to one of the normally closed solenoid valves 57 and 58 is opened. Since the actuator cams are placed on the drive shaft in the same relative position as corresponding rake arms and switches 53 and 54 are radially in line with the underflow outlets, it can be seen that as a cam 51 passes a switch 53 or 54 and a corresponding rake arm passes an underflow outlet 32 and 32' sludge discharge is stopped until the pre-set timed period just commencing has elapsed. During this period the rake rotates across the tank bottom to a point preceding the underflow outlet and is in position to discharge the thick sludge being pushed immediately in front of it. Thus, in reference to swicth 54 and timer 55, at the end of the timing period the circuit between timer 55 and solenoid valve 57 is completed energizing solenoid valve 57 allowing air signal from controller 66 to pass through pnuematic line 69 to pinch valve 33 opening the valve as shown and starting underflow through outlet 32. When the actuator cam reaches switch 54 timer 55 is again energized starting a new timing period de-energizing three-way solenoid valve 57 thus blocking air line 69 and allowing pinch valves 33 to close.

In order that a more constant measurement of sludge inventory may be obtained by recorder controller 66 switch 59 and normally closed two-way solenoid valve 60 are provided. As noted, switch 59 is mounted on stationary ring 52 in radial alignment with a point immediately preceding the position of sludge measuring device 40 in the tank proper. Although this is the preferred position of switch 59 it may be placed anywhere on ring 52 and in any relation to device 40. In the preferred position, however, the measurement takes place at the highest density. When one of the cams 51 depresses switch 59 solenoid valve 60 in line 65 is momentarily actuated opening line 65 and allowing a pneumatic signal to be sent to recorder controller 66 from differential pressure transmitter 63. The signal indicating the weight of solids in the compartment as of that moment is locked into the recorder controller and determines the degree of pinch valve opening during the next succeeding sludge discharge period and remains as such until the next following cam actuates switch 59.

Figure 6:
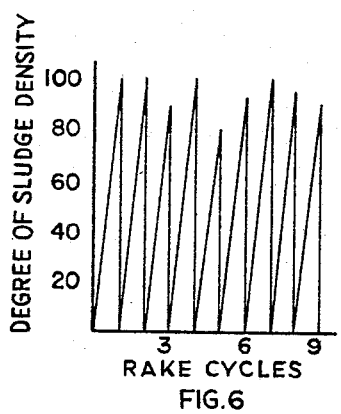
FIG. 6 is a graphical representation of a magnified section of a recorder controller chart showing fluctuations in sludge density in relation to rake arm position.
Figure 7:
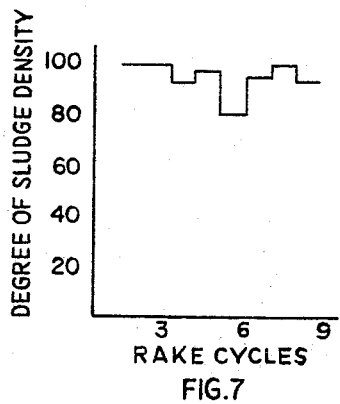
FIG. 7 is a similar chart section obtained in connection with the circuit of FIG. 5.

Variations in sludge density across the floor of the compartment can be seen from the graphical interpretations of magnified recorder controller chart records shown in FIG. 6 and FIG. 7. FIG. 6 is a portion of a chart record in which the switch 59 and solenoid valve 60 were not used in the circuit of FIG. 5 and shows the swing of the recorder pen from the peak and low readings from signals transmitted by the pressure differential transmitter 63 caused by passage of the rake arms past the tube 40. The peak signals result whenever a rake arm is immediately behind flow tube probe 40 and the lows are obtained immediately after the arm passes tube 40 clearly showing that the highest density sludge is carried immediately in front of the rake arms and that the lowest density sludge trails the rake arms. The sludge density scale from 0 to 100 is merely an arbitrary dimension between the maximum and minimum values recorded. With switch 59 and solenoid valve 60 in the system a chart record such as shown in FIG. 7 is obtained eliminating the large swings of the recorder pen by keeping the differential pressure transmitter signal from reaching the recorder controller during periods other than when the rake arms are immediately behind the flow tube probe 40. In other words, only the peak values from the pressure differential transmitter are recorded and such signal is locked in until the next trailing arm reaches the same location. By thus having a recorder controller record which deviates only slightly from the maximum values obtainable a more constant control over valve opening in relation to sludge quantity is maintained.

In an alternate embodiment shown in dotted lines in FIG. 5, there is provided a conventional torque recorder controller which may be used in combination with the sludge inventory recorder controller where large fluctuations in solids loadings to the clarifier are present or by itself if relatively stable conditions prevail, for varying the degree of pinch valve opening during each discharge cycle. Lines 72 carry a signal from a conventional torque transmitter (not shown) mounted on the drive head to torque controller 71. Constant air pressure is supplied through line 73 and the amplified signal from the torque controller is sent via line 74 to pneumatic diverting relay 75 which automatically selects the highest pressure signal between inventory recorder controller 66 and torque recorder controller 71, and transmits it via line 69 and branch lines 69 and 70 to the pinch valves during the discharge cycle. Thus, at times when torque greatly increases due to a large amount of sludge in front of the rakes and the reading obtained by the sludge inventory recorder controller is low due to decreased solids loading to the system, the torque recorder controller will take over and increase the pinch valve opening to compensate for the increased quantity of sludge being pushed by the rakes, thereby preventing overloading and possible breakdown of the clarifier.

Also, as mentioned, in a less preferred embodiment, the torque recorder controller may be used without the sludge inventory recorder controller whereupon it functions as the exclusive sensing means for varying the pinch valve opening during each timed discharge cycle. In such case line 74 is connected directly to line 68 and lines 69 and 70 supplying air to the pinch valves.

Figure 8:
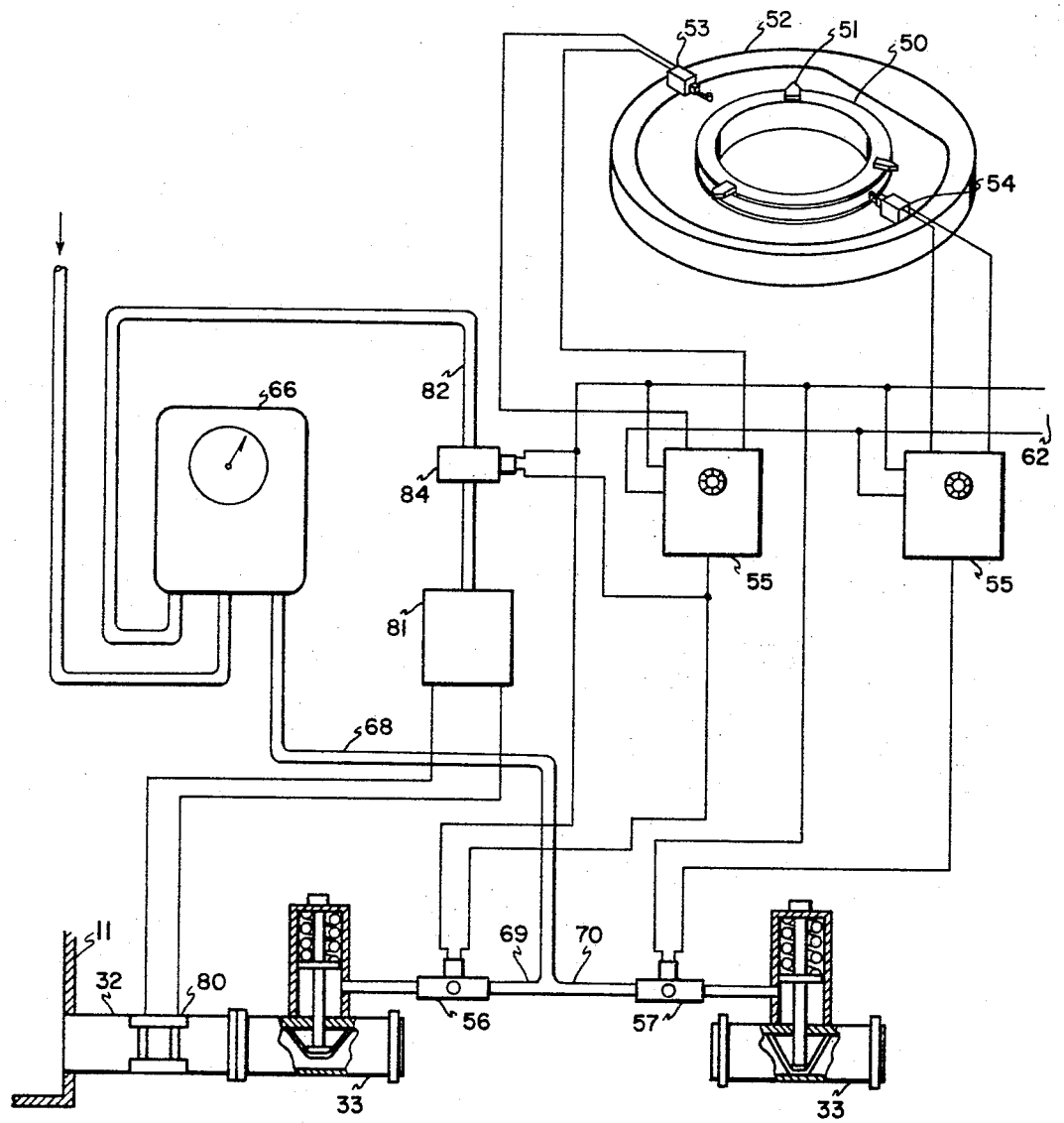
FIG. 8 is a schematic diagram of another embodiment of the sludge quantity sensing device and control circuits for operating the sludge outlet valves.

In FIG. 8 another embodiment is shown for controlling the degree of valve opening during each discharge cycle. The circuit and operation of switches 53 and 54, timers 55 and 56, and three way solenoid valves 57 and 58 are the same as described in connection with the embodiment of FIG. 5. However, in place of the flow tube and pressure differential measuring device of FIG. 5 there is provided a gamma gauge 80 mounted in one sludge outlet conduit 32 between the tank wall 11 and spring closed pinch valve 33. During each discharge cycle from that underflow outlet the density of the sludge being discharged is measured by the amount of radiation transmitted therethrough by the gamma gauge. The signal therefrom is circuited to a standard potentiometer transmitter 81 where it is converted to a pneumatic signal for transmission via line 82 to recorder controller 66. A normal closed two-way solenoid valve 84 is located in line 82. As can be seen, whenever the circuit between timer 55 and solenoid valve 57 is completed, that is, during the sludge discharge cycle, the circuit to solenoid valve 84 is also completed thereby holding the valve open and allowing the pneumatic signal from potentiometer transmitter 81 to be transmitted to recorder controller 66. The density of the sludge that is last to discharge is the final measurement taken by the gamma gauge during each discharge cycle and it is this measurement that is locked into recorder controller 66 when solenoid valve 84 is de-energized by the start of the next timed period. During the next succeeding discharge period when say solenoid valve 57 is energized, the pneumatic signal from the recorder controller is sent to pinch valve 33 via line 68 and branch line 69 controlling the degree of opening thereof. If the density goes down at the end of the discharge cycle indicating a low quantity of sludge in front of the rake, the pinch valve is only partially opened reducing the amount of sludge discharged allowing for a greater sludge build-up during the non-discharge period. The cycle is repeated successively as the arms rotate about the compartment.

Although the illustrated embodiments show means for varying the degree of valve opening during discharge dependent on the amount of sludge in front of the rake arms while the angular segment or timed period remains constant, it is also within the scope of the invention to vary the timed period during which discharge occurs and hold the valve opening constant during each discharge period thereby selectively removing only the highest density sludge from the clarifier.

Figure 3:
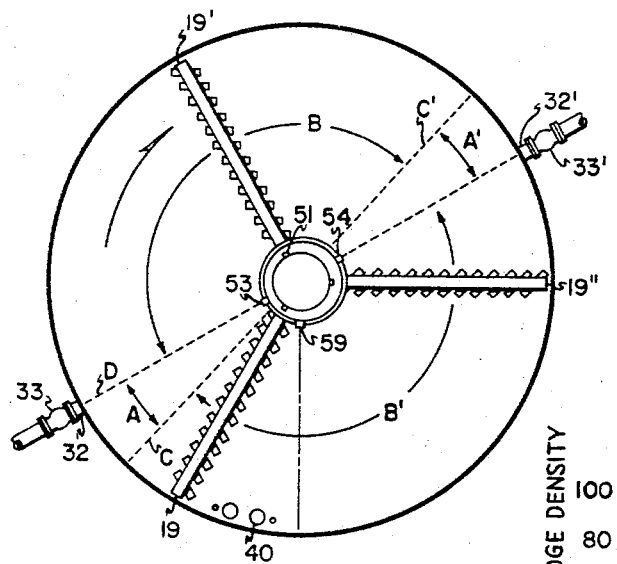
FIG. 3 is a schematic top view of one compartment or tray of the apparatus showing the position of the rake means in relation to the sludge outlets during the intervals when the outlet valves are open and closed.

The significance of the invention will be readily apparent when considered in relation to the graphical recorder controller chart record of FIG. 6 showing the relative density of sludge in front and behind each rake. With the clarifier apparatus of the prior art in which sludge is discharged continuously, sludge density variations at discharge corresponding to the peaks and lows of FIG. 6 is experienced. In other words, thin sludge trailing the rakes as well as high density sludge in front of the rakes is removed from the clarifier thereby reducing the overall density of the sludge obtained. In accordance with this invention, however, only the high density sludge in front of each rake is intermittently discharged. This sludge corresponds to the density peaks of FIG. 6. The angular segments A and A' of FIG. 3 showing the position of the rake arms during sludge withdrawal are representative of that portion of each rake cycle corresponding to the peak sludge densities of FIG. 6 as for example the upper 20% of each peak.

From the foregoing it will thus be apparent that the invention provides a unique method and apparatus for obtaining a higher density sludge than hitherto thought possible during the clarification of liquids containing suspended solids. The control and valve means enable the selective removal of only the highest density sludge. Since only a minimum of sludge need be retained in the sedimentation compartment in order to obtain a high density underflow the raking structure and entire drive mechanism may be made lighter thereby providing considerable savings in construction costs.

I claim:

1. Clarification apparatus of the type comprising a settling tank, influent feed means effluent withdrawal means, sludge discharge means, rotatable rake means centrally mounted in the tank for outwardly raking settled sludge on the bottom of the tank to said sludge discharge means, valve means in said sludge discharge means, timing means for periodically opening said valve means in relation to the position of said rake means, and means sensitive to the quantity of high density sludge in front of said rake means for controlling the amount of sludge withdrawn during each discharge period.

2. Clarification apparatus of the type comprising a settling tank, influent feed means, effluent withdrawal means, a sludge discharge outlet in the bottom periphery of said tank, centrally mounted rake means for outwardly raking sludge on the tank bottom towards said discharge outlet, valve means in said sludge discharge outlet, timing means for periodically opening said valve means preceding each sweep of said rake means past said sludge discharge outlet, sensing means for determining the quantity of high density sludge in front of said rake means, and control means responsive to said sensing means for limiting the amount of sludge discharged during each period to the quantity of high density sludge in front of said rake means.

3. The apparatus of claim 2 in which said sensing means comprises a flow tube vertically mounted in said tank and extending from above the surface of liquid therein to just above the bottom, means for transferring liquid from within said tank to the upper portion of said flow tube, a first bubbler tube leading into said flow tube and terminating a set distance under the surface of the liquid in the tank and connected to a constant air supply source, a second bubbler tube outside said flow tube and extending the same distance beneath the liquid level in said tank as said first bubbler tube and connected to a constant air supply source, and means for determining the difference in back pressure between said bubbler tubes.

4. The apparatus of claim 2 in which said sensing means for determining the quantity of high density sludge comprises a torque sensing means on said rake means for measuring and transmitting the torque on said rake means.

5. The apparatus of claim 2 in which said sensing means for determining the quantity of high density sludge comprises a density measuring device mounted in said discharge outlet for determining the final density of sludge withdrawn at the end of each discharge period.

6. Clarification apparatus including a settling compartment having influent feed means, effluent withdrawal means, a sludge discharge outlet in the bottom periphery of said compartment, centrally mounted rake means for outwardly raking sludge on the compartment bottom towards said discharge outlet, a normally closed valve in said sludge discharge outlet, timing means for intermittently opening said valve immediately preceding and up to each sweep of said rake means past said outlet, sensing means for determining the quantity of high density sludge extending in front of said rake means, and valve control means responsive to said sensing means for controlling the degree of valve opening during each open period in response to the signal from said sensing means whereby only the highest density sludge is discharged from said compartment.

7. The clarification apparatus of claim 6 in which a plurality of said compartments are disposed concentrically above one another.

8. The improved method for the clarification of liquids containing suspended solids comprising the steps of introducing said liquid into a pool and subjecting it to sedimentation to form in said pool a settled sludge overlain by clarified effluent, withdrawing effluent from an upper portion of the pool, raking settled sludge over the bottom of the pool to a peripheral discharge outlet by engaging said sludge with rakes moving toward and past the outlet, and intermittently withdrawing sludge from the pool by opening said outlet for a timed interval preceding each movement of the rakes past said outlet.

9. Apparatus for separating solids from liquids by sedimentation comprising a tank, means for introducing liquid into the tank, means for withdrawing clarified effluent from the upper portion of the tank, a normally closed valved sludge outlet adjacent the bottom of the tank, rake means mounted for movement over the tank bottom for pushing settled sludge ahead of said rakes toward said normally closed valved sludge outlet, and means for opening said normally closed valved sludge outlet upon approach of said rakes to enable withdrawal of sludge from in front of said rakes whereby only the highest density sludge on the bottom of said tank is removed.

10. Apparatus for separating solids from liquids by sedimentation comprising a tank, means for introducing feed liquid into said tank, means for withdrawing clarified effluent from said tank, a sludge outlet adjacent the bottom periphery of said tank, rake means centrally mounted for rotation within the tank for outwardly raking sludge on the floor of said tank toward said sludge outlet, valve means in said sludge outlet, means for periodically opening said valve means during a discharge period preceding each movement of said rake means past said outlet, and means for controlling the amount of sludge discharged during each discharge period whereby the highest density sludge in said tank is selectively removed.

References Cited

UNITED STATES PATENTS

| | | | |
|---|---|---|---|
| 1,392,215 | 9/1921 | Peck | 210—528 X |
| 3,006,475 | 10/1961 | Wood | 210—112 |
| 3,151,848 | 10/1964 | Kadden | 210—528 X |
| 3,166,502 | 1/1965 | Kelly | 210—112 X |
| 3,281,594 | 10/1966 | Garrison | 210—83 X |

FOREIGN PATENTS

| | | |
|---|---|---|
| 616,038 | 3/1961 | Canada. |
| 333,974 | 8/1930 | Great Britain. |

REUBEN FRIEDMAN, *Primary Examiner.*

D. M. RIESS, *Assistant Examiner.*